United States Patent [19]

Fredriksen

[11] Patent Number: 5,207,736
[45] Date of Patent: May 4, 1993

[54] CONTROL OF A DISPLACEMENT MACHINE OF A HYDROSTATIC-MECHANICAL TORQUE SHIFT TRANSMISSION

[75] Inventor: Nils Fredriksen, Harsewinkel, Fed. Rep. of Germany

[73] Assignee: Claas oHG, Harsewinkel, Fed. Rep. of Germany

[21] Appl. No.: 858,284

[22] Filed: Mar. 26, 1992

[30] Foreign Application Priority Data

Mar. 26, 1991 [DE] Fed. Rep. of Germany ....... 4109884

[51] Int. Cl.$^5$ ............................................. F16H 47/04
[52] U.S. Cl. .................................... 74/866; 74/730.1; 74/393; 475/72; 60/444
[58] Field of Search ............... 74/730.1, 731.1, 732.1, 74/733.1, 393, 718, 866; 475/72, 73, 74, 76; 60/444

[56] References Cited

U.S. PATENT DOCUMENTS

| | | | |
|---|---|---|---|
| 3,204,486 | 9/1965 | De Lalio | 475/76 X |
| 3,212,358 | 10/1965 | De Lalio | 475/76 X |
| 4,309,917 | 1/1982 | Leet | 74/861 |
| 4,776,233 | 10/1988 | Kita et al. | 475/76 |
| 5,052,986 | 10/1991 | Jarchow et al. | 475/76 |
| 5,129,867 | 7/1992 | Fredriksen et al. | 475/74 X |

FOREIGN PATENT DOCUMENTS 0403156 6/1990 European Pat. Off. .
3838767 4/1990 Fed. Rep. of Germany .

OTHER PUBLICATIONS

Technische Akademie Esslingen Weiterbildungszentrum, Montag, 3, und Dienstag Dec. 4, 1990; Veranstaltungsort Ostfildren (Nellingen) Akademiegebaude, In den Anlagen 5; Lehrgang Nr. 13309/62.175 "Stufenlose Getriebe in Fahrzeugen".

Primary Examiner—Allan D. Herrmann
Assistant Examiner—William O. Trousdell
Attorney, Agent, or Firm—Browdy and Neimark

[57] ABSTRACT

A process for controlling a hydrostatic adjustment gear (HG) of a hydrostatic-mechanical, continuous, split-output torque shift transmission, where a displacement volume ($V_{new}$) is controlled following the engagement of a clutch (K2, K3) of a new gear, taking into consideration a leakage volume ($DV_{old}$) in respect to a theoretical displacement volume ($V_{th}$), after which the clutch (K2, K3) of the respective previously operating gear, which is still turning, is disengaged, where each new displacement volume ($V_{new}$) is determined from the prior leakage volume ($DV_{old}$) in accordance with different hydraulic pressure conditions in the adjustment gear (HG) prior to and following the shifting operation, where the setting of the new displacement volume ($V_{new}$), which is determined in accordance with the hydraulic pressure conditions from the prior leakage volume ($DV_{old}$), takes place in respect to the theoretical displacement volume ($V_{th}$) in accordance with a new leakage volume ($DV_{new}$). During upshifting and downshifting a differing ratio of the leakage volumes is taken into consideration, which occurs during the shifting process because of falling or rising of the hydraulic pressure. Therefore the disengagement of the clutch (K2, K3) of the prior gear takes place without torque loading during upshifting as well as downshifting.

13 Claims, 3 Drawing Sheets

CONTROL OF A DISPLACEMENT MACHINE OF A HYDROSTATIC-MECHANICAL TORQUE SHIFT TRANSMISSION

FIELD OF THE INVENTION

The present invention relates to improvements in transmissions, and more particularly to controlling a hydrostatic adjustment gear of a hydrostatic-mechanical, continuous, split-output torque shift transmission, where a displacement volume is controlled following the engagement of a clutch of a new gear, taking into consideration a leakage volume with respect to a theoretical displacement volume, after which the clutch of the respective previously operating gear, which is still turning, is disengaged.

BACKGROUND OF THE INVENTION

A control of a displacement machine of this general type is known from German Patent Publication DE No. 38 38 767 C2, where at the time of each shifting change the displacement volume is adjusted in accordance with a theoretical oil requirement plus a certain leakage loss, so that the clutch of the previous gear which is to be disengaged can be disconnected as torque-free as possible. Determination of a leakage loss to be taken into consideration represents a very inaccurate compromise, because the displacement machine operates with different hydraulic transmission segments before and after the shift points of successive gear stages. The hydraulic pressure conditions and thus the leakage losses are therefore of different sizes, something which was not considered. Thus the intended disengagement of the clutch members at low torque is either never attained or only when upshifting or down-shifting, which inevitably results in damage to the clutch and the gear, and in a jerky operation.

SUMMARY OF THE INVENTION

It is an object of the invention to control the displacement machine where a torque-free setting of the clutch members to be disengaged takes place during each shift operation, and to provide a control device therefor.

This object is attained by determining each new displacement volume from the prior leakage volume in accordance with different hydraulic pressure conditions in the adjustment gear prior to and following the shifting operation. Setting of the new displacement volume, which is determined in accordance with the hydraulic pressure conditions from the prior leakage volume, takes place with respect to the theoretical displacement volume in accordance with a new leakage volume.

In the known displacement machines the displacement volume is provided by a pivoting displacement of a block which takes place electrically in a controlled manner by means of a proportionally acting hydraulic adjustment device. In a continuous, hydrostatically split-output gear, the displacement machine is utilized to transfer output additively prior to the upshift of a gear stage and subtractingly following shifting into the higher gear. In both cases theoretically synchronous rpm are specified for the engaging and disengaging clutches, so that jerk-free engagement of the clutch of the new gear takes place, as well as jerk-free disengagement of the clutch of the previous gear afterwards. In actual operation it is then required for providing a synchronous operation of the clutch that, prior to engagement of the new gear, the hydrostatic gear is controlled in such a way that its leakage losses are also covered. Since following engagement of the new gear, leakage losses again occur with respect to the continuously operating displacement unit, it is required, for setting a torque-free operation at the clutch to be disengaged, to provide a correcting reversal of the displacement volume which takes these conditions into account, where the differing leakage losses must be considered.

In accordance with the present invention it is taken into account when determining this correcting adjustment that the pressure conditions and thus the leakage losses differ by the shift ratio with respect to the splitting conditions utilized in each case in the upper rpm range of the lower gear and the lower rpm range of the higher gear. For this reason the leakage losses prior to upshifting in the synchronous state of the clutch to be engaged are less than after engagement in case of the adjustment free from torque of the clutch to be disengaged. When downshifting, the conditions are reversed. In accordance with the present invention these differences in the leakage losses are taken into account in the adjustment of the displacement volume prior to and after shifting, so that disengagement is only performed when no torque is transmitted via the clutch elements.

For taking into account these leakage differences prior to a following engagement, along with the reversal of the effect of the hydraulic gear branch connected therewith, the adjustment of the swash plate which determines the displacement volume is not determined symmetrically in respect to the neutral position, but with different correcting angles which are adapted to the respective relative leakage losses and which compensate for them.

The conditions of the corrections of the displacement settings are determined in the following manner:

1. Setting when upshifting

During upshifting the flow of output in the hydrostatic gear changes during gear changes from an additive output (the pump is the adjustment unit and the motor the constant unit) to idle output (the pump is the constant unit and the motor the adjustment unit). For this reasons the high and low pressures of the two connecting lines of the units change and high pressure theoretically increases by the factor of the setting ratios of the gears.

High pressure and the amount of leakage oil in the hydrostatic component are in an approximately proportional ratio to each other. For this reason it is possible to assume a constant leakage oil change factor k during each load.

From this it is determined that following upshifting the adjustment for attaining the set conditions must be such that the new displacement volume equals the theoretical displacement volume increased by its product with the leakage oil change factor, less the prior displacement volume multiplied by the leakage oil change factor, i.e. the equation $$V_{new} = V_{th} + (V_{th} \times k) - (V_{old} \times k) \tag{1}$$

2. The conditions during downshifting

During downshifting the output flow in the hydrostatic component changes from idle output to additive output. In the course of this, high pressure and low pressure in the connecting lines of the hydraulic units change, and high pressure theoretically drops by the factor of the setting ratios of the gears. Because of the approximate proportionality between the pressure and the leakage oil loss in the hydrostatic component it is possible here, too, to assume the constant leakage oil change factor k.

From this it is determined that following downshifting the adjustment for attaining the set conditions must be such that the new displacement volume equals the theoretical displacement volume increased by the latter's quotient with the leakage oil change factor, less the quotient of the prior displacement volume with the leakage oil change factor, i.e. the equation:

$$V_{new} = V_{th} + V_{th}/k - V_{old}/k \quad (2)$$

The leakage oil change factor k can be experimentally obtained. In principle it is greater than 1. Customarily it lies between 1.5 and 2.5. In a gear with a setting ratio of 1:1.66 it was found that k=2 was of practical use.

Advantageously, a control circuit is provided for setting the displacement volume, and is supplied with a setting signal of the setting device as the actual signal. It is furthermore provided that in a known manner rpm signals are derived from the drive and take-off shafts of the hydrostatic gear unit. By this means and keeping in mind the rpm ratios known for the individual gears, effective engagement of the next desired gear takes place during synchronism at the clutch. Simultaneously, the respective prior actual setting signal is obtained, the value of which is determined from the theoretical displacement volume and the prior leakage oil loss. Together with the theoretical actual setting signal, a new set-point setting signal, which is to be preset in the control, is formed in such a way that the new leakage oil losses are taken into consideration. Then, when the control operation started in this manner is completed, the clutch of the former gear is disengaged and passage through the gear is now continued by presetting the displacement volume with the further changes.

In practical use it is not necessary to know the theoretically loss-free setting, since the actual setting signals, which are obtained during the synchronous states during upshifting and downshifting and which are used for engagement and the values of which are stored, are also the actual settings for disengagement of the same clutch, as long as the same load conditions prevail. Advantageous consideration of changes of the leakage conditions during running operation is achieved in that possible differences between a newly obtained actual signal during the synchronous state and the respective previously obtained actual signal are always determined and the distance of the optimal new set-point signal with respect to the prior set-point signal is directly obtained therefrom by means of a conversion factor.

This control also provides the adaptation to the leakage behavior of the device which changes during running operation, which depends on the temperature of the hydraulic oil and of the adjustment unit and changes with the load. The determination of the leakage oil losses at the start of each shifting operation and the pre-calculation of the losses after the operation and their consideration in determining the set-point automatically includes all running changes of the operational conditions.

BRIEF DESCRIPTION OF THE DRAWINGS

FIG. 1 is a schematic view of a multiple-gear drive;
FIG. 2 shows the hydrostatic output portions of the gear;
FIG. 3 shows the hydrostatic pressure conditions of the gear.

DETAILED DESCRIPTION OF EMBODIMENTS

Figure 1:
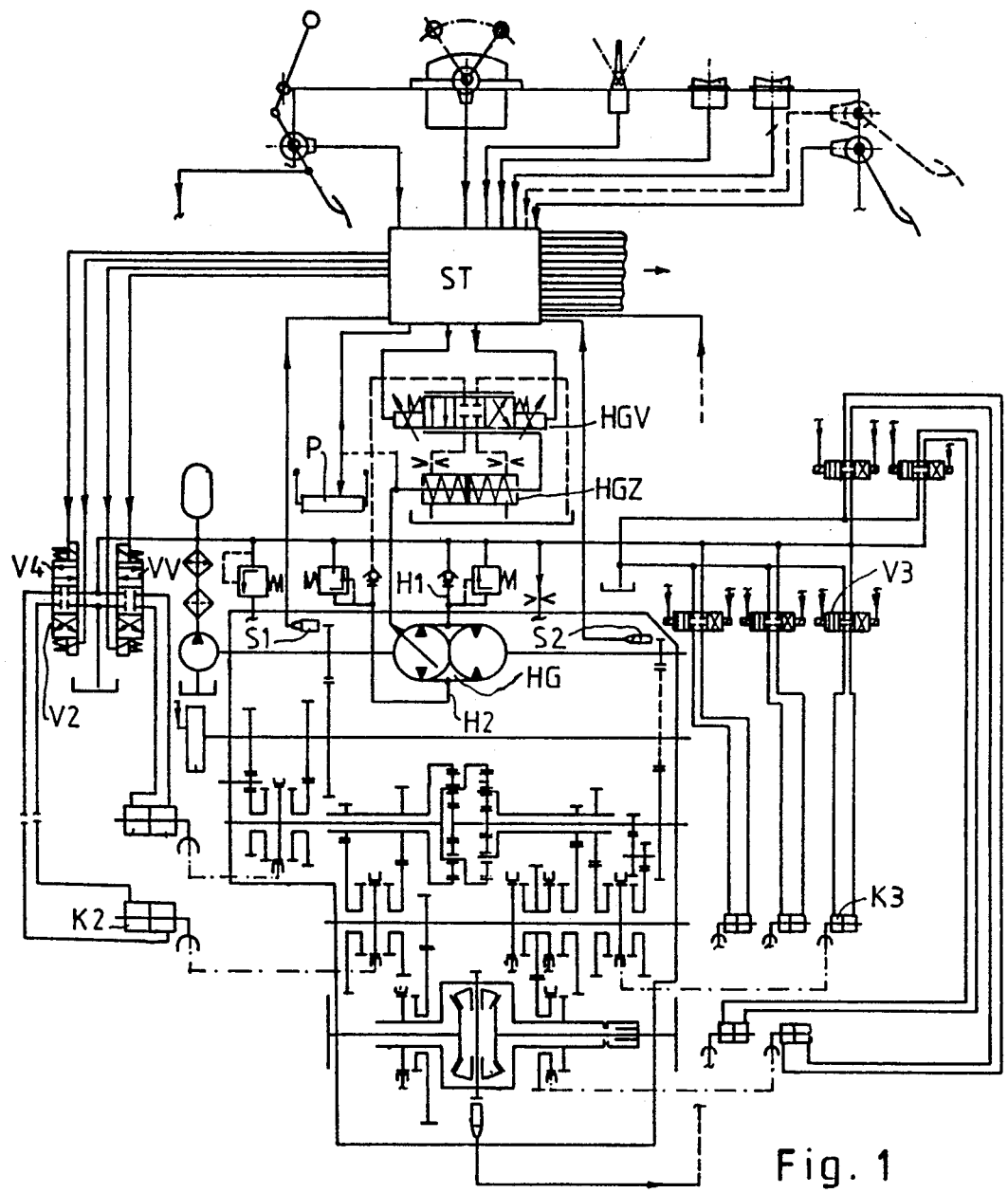
FIGS. 1 to 3 illustrate an advantageous embodiment of a gear with the adjustment device which performs setting and the clutch operation in accordance with the invention.

FIG. 1 shows a hydrostatic-mechanical, split-output torque shift transmission, the hydrostatic branch of which consists of a hydrostatic converter, i.e. a hydrostatic or hydraulic adjustment gear or unit (HG). The latter is controlled by means of an electronic control device (ST) which actuates a setting-proportional-acting hydraulic control cylinder (HGZ) via a pair of electro-hydraulic control valves (HGV) so that it determines the adjustment angle and in this way the displacement volume of the hydraulic adjustment gear (HG).

For example, for upshifting from second to third gear at a preset rpm ratio at the input and output shaft of the hydrostatic converter (HG), the presence of this rpm ratio is determined from the signals of the rpm sensors (S1, S2) in the electronic control device (ST), the electro-hydraulic third gear valve (V3) is actuated by the control device (ST) which causes the third gear clutch (K3) to engage hydraulically. The determined rpm ratio assures that the gear elements of the clutch (K3) of the third gear rotate synchronously prior to shifting. Then the proportional control valve (HGZ) is charged by the control device (ST) via the electro-hydraulic control valve (HGV) in such a way that it is adjusted in a corrected manner in accordance with the new leakage losses, so that no torque is transferred to the clutch claws of the clutch (K2) of the second gear drive which rotates along with it. The control device (ST) disengages the second gear valve (V2) and consequently the second gear clutch (K2) is hydraulically disengaged without jerking by disengaging the associated controllable valve (V2).

To downshift from third gear into second gear, the operations for synchronization at the clutch to be disengaged, the engagement of the new gear, the relieving of the clutch and the disengagement of the clutch of the previous gear are performed in reverse. However, attention must be paid to the fact that during downshifting it is necessary to perform an adjustment of the displacement volume in excess of the prior displacement volume obtained during clutch engagement, after which disengagement, and only then the subsequent reduction of the displacement volume, take place. Corresponding shifting operations take place during other gear changes.

The difference in the leakage in the two displacement units (HG) and the consumers connected to the hydraulic lines (H1, H2) is the result of the pressure differences prior to and following the shifting operations.

Figure 2:
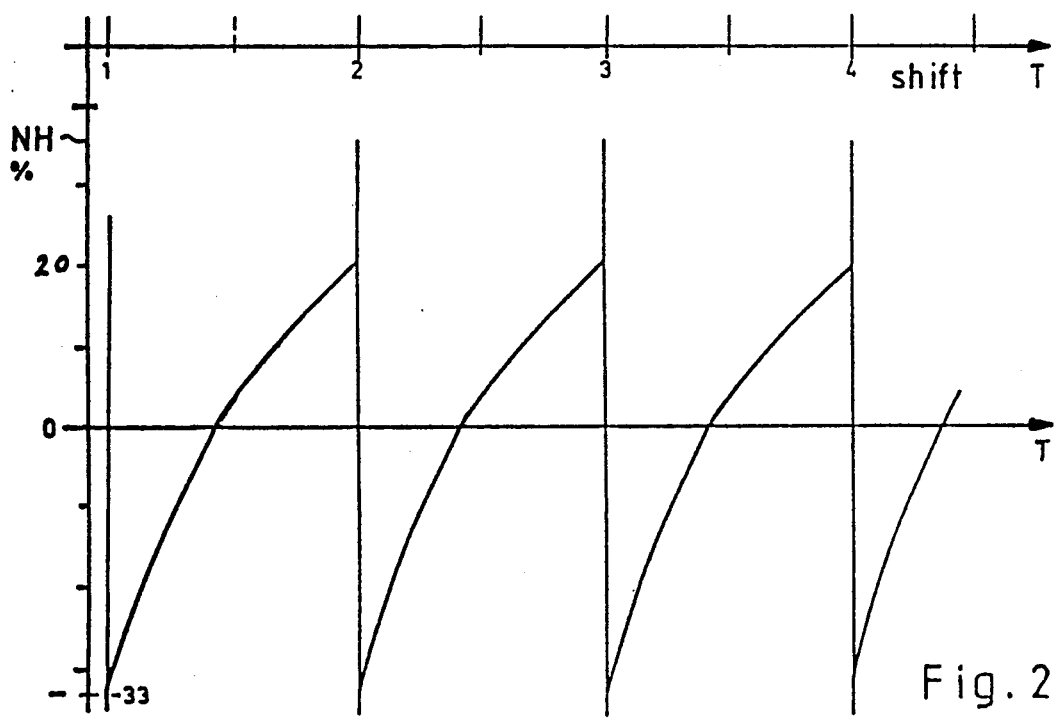

These pressure differences in the hydraulic lines are the result of the respective hydrostatic output portion of the output transmitted in the hydraulic drive branch. This output portion (NH) is shown in FIG. 2 in relation to the transmission ratio (T) for the lower gears of the drive. Because the setting ratio here provided is 1:1.66, a hydrostatically transmitted portion of minus 33% or 20% is the result, depending on whether the gear stage is operated in the lower or the upper rpm range.

Figure 3:
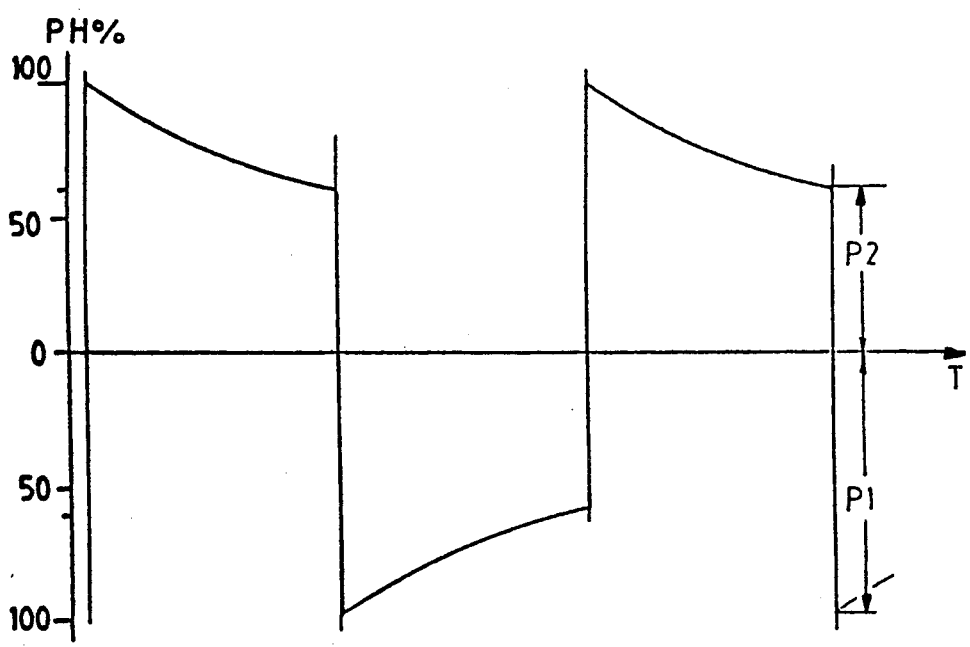

FIG. 3 shows the pressure conditions in the hydrostatic branch. In their values, the pressures (P1) and (P2) on both sides of the shift point have the same relation as the adjustment ratio.

The settings of the proportional control cylinder (HGZ) preset at the engagement or disengagement points of the clutches (K2, K3) (see FIG. 1), which take into consideration the different leakages, are made by means of suitable charging of one of the oppositely acting adjustment valves of the electro-hydraulic valve unit (HGV) by the control device (ST).

For exact setting of the proportional valve unit (HGV), it is supplied with a presettable current by the control device (ST). In a preferred manner this current is reported back to the control device (ST) by a current sensor (IS), so that, when there is synchronism, because of proportionality it is possible to store the current strength reported at a clutch which is to be disengaged and to evaluate it later as a preset value.

In another embodiment of the device, the amount of displacement of the proportional adjustment cylinder (HGZ) is fed back to the control device (ST) by means of a setting indicator, for example a potentiometer (P) at the collector ring side, for exact setting, so that by means of an adjustment program the control device provides in each case the exact setting to the preset optimal displacement volume.

The setting signals of the setting indicator (P), which are derived during synchronous operation of the clutch elements prior to upshifting and prior to downshifting, are used for determining the setting which must be set in the opposite case for relieving the clutch to be disengaged, and which are then set by the control.

Figure 4:
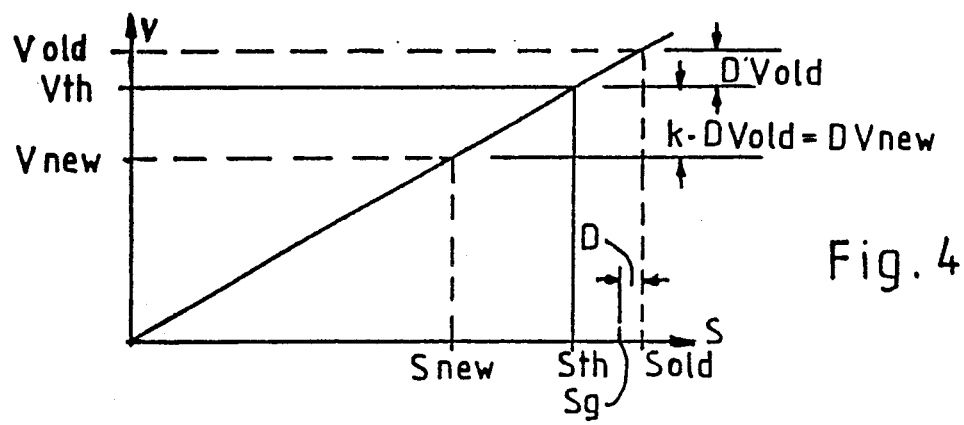
FIG. 4 is a setting diagram for upshifting.

In FIG. 4 the dependency of the displacement volume and the associated settings of the control means for the displacement volume during upshifting are shown schematically, i.e. enlarged in the switching range. The prior displacement volume ($V_{old}$) is greater by the leakage volume ($DV_{old}$) than the theoretical displacement volume ($V_{th}$). The new displacement volume ($V_{new}$), where the old gear drive is free of a load, is smaller, by a leakage volume difference greater by the leakage volume factor (k), ($DV_{old} \times k$), than the theoretical displacement volume ($V_{th}$). Accordingly, the old and the new setting ($S_{old}$, $S_{new}$) are higher or lower by a lesser or greater amount than the theoretical setting ($S_{th}$). In this case the leakage volume factor is larger than 1 in principle, since different pressure conditions obtain in the old and the new states, which lead to differences. As can be seen, the result is equation (1).

Figure 5:
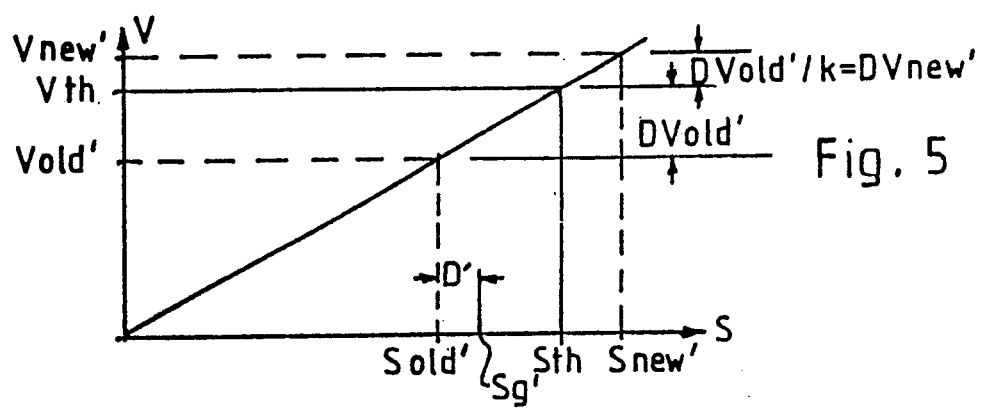
FIG. 5 is a setting diagram for downshifting.

The dependence of the displacement volume and the associated settings of the displacement control means during downshifting are schematically shown in FIG. 5, enlarged in the clutch setting range. It can be seen that after downshifting the prior displacement volume ($V_{old'}$) lies below the theoretical displacement volume ($V_{th}$) by a larger loss volume ($DV_{old'}$) than the new displacement volume ($V_{new'}$), which is required for freeing the prior gear drive of the load, lies above the theoretical displacement volume ($V_{th}$). This leakage loss ($DV_{new'}$) is the result of the quotient of the prior leakage loss ($DV_{old'}$) and the leakage volume factor (k). As can be seen, equation (2) is the result. The illustrated dependence of the prior and the new settings ($S_{old'}$, $S_{new'}$) during downshifting in their setting in respect to the theoretical setting ($S_{th}$) is the result of the assumed linear connection of the settings of the control means in relation to the volumes.

As can be seen in the drawing, the setting ($S_{new'}$) in which jerk-free disengagement takes place, is controlled further than the clutch engaging setting ($S_{old'}$). Return of the control to the opposite setting thus takes place only after continued control, in case the drive is intended to be shifted further.

Since in operation the leakage conditions can change, namely with different loads, for example pulling or pushing operation, i.e. during braking, as well as with temperature, it is advantageous if the respective values of the setting sensor signal ($S_{old}$, $S_{old'}$) present in the case of synchronism with only one clutch activated, are stored in the form of set-point adjustment signals to be preset in the setting control, so that the signal ($S_{old}$) for upshifting is used as the set-point signal ($S_{new'}$) during downshifting, and the signal ($S_{old'}$) during downshifting as the set-point signal ($S_{new}$) during upshifting.

A set-point signal presetting which is even more adapted to changing conditions is attained when one detected synchronous setting ($S_{old}$, $S_{old'}$) is put into a relationship with the corresponding, stored prior synchronous setting ($S_g$ and $S_{g'}$) and by means of the connection the associated new disengagement setting ($S_{new}$, $S_{new'}$) is calculated from the stored disengagement setting ($S_g$ and $S_{g'}$) via the leakage volume factor k.

If during upshifting a difference (D) of the stored value ($S_g$) in relation to the newly determined setting value ($S_{old}$) is detected, the new setting set-point value ($S_{new}$) for disengagement during upshifting is the result of the setting value ($S_{g'}$), stored during the last downshifting, with the leakage volume factor k, namely:

$$S_{g'} + D \cdot k = S_{old'} = S_{new}; \quad D = S_g - S_{old} \qquad (3)$$

Correspondingly, when downshifting the result for a detected difference D' is:

$$S_g + D'/k = S_{old} = S_{new'}; \quad D' = S_{g'} - S_{old'} \qquad (4)$$

as equation (4).

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. In a process for controlling a hydrostatic adjustment gear (HG) of a hydrostatic-mechanical, continuous, split-output torque shift transmission providing two clutches (K2, K3), where following an engagement of one of said two clutches (K2, K3) of a new gear a setting of a new displacement volume ($V_{new}$, $V_{new'}$) takes place which is determined in respect to a theoretical displacement volume ($V_{th}$) taking into consideration an old leakage volume ($DV_{old}$, $DV_{old'}$), which was present at a prior shift operation, thereafter the remaining one of said two clutches (K2, K3) of a respective previously operating gear, which is still turning, is disengaged, the improvement wherein a new leakage volume ($DV_{new}$, $DV_{new'}$) is determined from the old leakage volume ($DV_{old}$, $DV_{old'}$) in accordance with different hydraulic pressure conditions in the adjustment gear (HG) prior to and following the shift operation, and the new displacement volume ($V_{new}$, $V_{new'}$) is determined from the new leakage volume ($DV_{new}$, $DV_{new'}$) with respect to the theoretical displacement volume ($V_{th}$), whereafter the setting of the new displacement volume ($V_{new}$, $V_{new'}$) takes place.

2. A process in accordance with claim 1, wherein the new leakage volume ($DV_{new}$) is calculated at each upshifting of a gear stage from the old leakage volume ($DV_{old}$) by multiplication with a leakage volume factor (k), which is greater than 1, and the new leakage volume ($DV_{new'}$) at each downshifting of a gear stage is calculated from the old leakage volume ($DV_{old'}$) by division by the leakage factor (k).

3. A method in accordance with claim 1, wherein the new displacement volume to be set is determined during upshifting in accordance with the equation $$V_{new} = V_{th} + V_{th} \times k - V_{old} \times k$$

and during downshifting in accordance with the equation $$V_{new'} = V_{th} + V_{th} \times 1/k - V_{old'} \times 1/k.$$

4. A method in accordance with claim 2, wherein the leakage volume factor (k) for a gear with a setting ratio of 1:1.66 is between k=1.5 and k=2.5.

5. A device for executing the method in accordance with claim 1, wherein the adjustment gear (HG) is controllably connected with a proportional valve (HGZ), which is actuated by an electronic control device (ST), which in accordance with the method and by means of a control program controls a set of control valves (HGV) and the clutches (k2, K3) by means of electro-hydraulic valves (V3, V2).

6. A device in accordance with claim 5, wherein on the proportional valve (HGZ) or on the adjustment gear (HG) a setting sensor (P) is disposed a setting signal of which ($S_g$, $S_g'$) is supplied to the control device (ST), and which is used as a feed back signal in a control loop for setting the new displacement volume ($v_{new}$, $V_{new'}$).

7. A device in accordance with claim 6, wherein on an input shaft and on an output shaft of the adjustment gear (HG) tachometer sensors (S1, S2) are disposed, tachometer signals of which are monitored by the control device (ST) for determining a state of synchronism at said one of said two clutches (K2, K3) currently to be engaged, and when reaching the state of synchronism during an upshift operation an actual old value of the setting signal is stored as a stored upshift setting signal (Sg) which is preset as a new upshift setpoint setting signal ($S_{new}$) in a following downshift operation, when disengaging a first clutch of said two clutches (K2, K3) currently engaged and when reaching the state of synchronism during a downshift operation an actual old setting signal ($S_{old'}$) is stored as an old downshift setting signal ($S_{g'}$) which is preset as a new downshift setpoint setting signal ($S_{new'}$) in a following upshift operation, when disengaging a second clutch of said two clutches (K2, K3) currently engaged.

8. A device in accordance with claim 7, wherein in the state of synchronism at said first clutch (K2, K3) to be operated upshifting an upshift difference (D) is calculated from the stored upshift setting signal ($S_g$) and the actual old upshift setting signal ($S_{old}$) and the new upshift setpoint setting signal ($S_{new}$) is calculated from the stored downshift setting signal ($S_{g'}$) and the upshift difference (D) taking into consideration a leakage volume factor (k), and wherein in the state of synchronism at said second clutch (K2, K3) to be operated downshifting a downshift difference (D') is calculated from the stored downshift setting signal ($S_{g'}$) and an actual old downshift setting signal ($V_{old'}$), and the new downshift setpoint setting signal ($S_{new'}$) is calculated from the stored upshift setting signal ($S_g$) and the downshift difference (D') taking into consideration a leakage volume factor (k).

9. A device in accordance with claim 5, wherein the proportional valve (HGV) is supplied by the control device (ST) with a presettable electrical current.

10. A device in accordance with claim 4, wherein k=2.

11. A method in accordance with claim 2, wherein a new displacement value to be set is determined during upshifting in accordance with the equation $$V_{new} = V_{th} + V_{th} \times k - V_{old} \times k$$

and during downshifting in accordance with the equation $$V_{new'} = V_{th} + V_{th} \times 1/k - V_{old'} \times 1/k.$$

12. A device for executing the method in accordance with claim 2, wherein the adjustment gear (HG) is controllably connected with a proportional valve (HGZ), which is actuated by a set of electro-hydraulic control valves (HGV), which is actuated electrically by an electronic control device (ST), which in accordance with the method and by means of a control program controls the set of control valves (HGV) and the clutches (K2, K3) by means of electro-hydraulic valves (V3, V2).

13. A device for executing the method in accordance with claim 3, wherein the adjustment gear (HG) is controllably connected with a proportional valve (HGZ), which is actuated by a set of electro-hydraulic control valves (HGV), which is actuated electrically by an electronic control device (ST), which in accordance with the method and by means of a control program controls the set of control valves (HGV) and the clutches (K2, K3) by means of electro-hydraulic valves (V3, V2).

* * * * *